(12) United States Patent
Alexander et al.

(10) Patent No.: US 10,659,446 B2
(45) Date of Patent: May 19, 2020

(54) CONVERSATIONAL AUTHENTICATION

(71) Applicant: salesforce.com, inc., San Francisco, CA (US)

(72) Inventors: Josh Alexander, Austin, TX (US); Seth Holloway, Austin, TX (US); Evan Tyler Grim, Austin, TX (US); Ian Glazer, Washington, DC (US); William Charles Mortimore, Jr., San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 196 days.

(21) Appl. No.: 15/621,628

(22) Filed: Jun. 13, 2017

(65) Prior Publication Data
US 2018/0359233 A1   Dec. 13, 2018

(51) Int. Cl.
G06F 7/04 (2006.01)
H04L 29/06 (2006.01)
H04W 12/06 (2009.01)

(52) U.S. Cl.
CPC ............ *H04L 63/08* (2013.01); *H04L 63/083* (2013.01); *H04L 63/0861* (2013.01); *H04W 12/0602* (2019.01); *H04L 2463/082* (2013.01)

(58) Field of Classification Search
CPC ... H04L 63/08; H04L 63/105; H04L 63/0861; H04L 2463/082
USPC .......................................................... 726/4
See application file for complete search history.

(56) References Cited

U.S. PATENT DOCUMENTS

| | | | |
|---|---|---|---|
| 2009/0199276 A1* | 8/2009 | Schneider ........... | H04L 63/0815 726/5 |
| 2011/0265149 A1* | 10/2011 | Ganesan ............... | H04L 9/3226 726/4 |
| 2016/0094991 A1* | 3/2016 | Powell ................. | H04W 12/06 455/411 |
| 2016/0359826 A1* | 12/2016 | Clark ...................... | H04W 4/21 |
| 2017/0310707 A1* | 10/2017 | Amelchenko ....... | H04L 63/0853 |

* cited by examiner

*Primary Examiner* — Mohammad W Reza
(74) *Attorney, Agent, or Firm* — Kowert, Hood, Munyon, Rankin & Goetzel, P.C.

(57) ABSTRACT

Techniques are disclosed relating to contextual authentication across different applications based on user communications. In some embodiments, a user is preauthenticated to certain actions on a second application based on the user's communication via a first application. The user's communication via a first application provides contextual information that may be used to preauthenticate a request to perform an action on the second application. Contextual information may include the user's communication itself and/or communications characteristics that are determined from the user's communications. In some embodiments, the degree of preauthentication progressively increases or decreases with the degree of use on the first application; that is, the user is preauthenticated to greater or fewer portions of an authentication procedure, to perform greater or fewer actions, or to perform actions more or less critical to security, as additional information regarding the user's communication on the first application becomes available. In some embodiments, preauthentication may be revoked as additional contextual information becomes available on the first application.

19 Claims, 9 Drawing Sheets

Receive additional information indicative of communications between the user and a third application
1010

Determine, based on the received information and the additional received information, to preauthenticate the user to the at least a portion of the authentication procedure to perform the operation via the second application
1020

Communicate, to the authentication module of the second application, that the at least a portion of the authentication procedure is approved for a subsequent request to perform the operation via the second application
1030

*FIG. 10*

CONVERSATIONAL AUTHENTICATION

BACKGROUND

Technical Field

Techniques are disclosed relating to computer security, and more specifically, to pre-authorization techniques based on conversational characteristics across different applications.

Description of the Related Art

The security community has long sought a viable second factor to supplement and fortify passwords as a means for user authentication. Previous attempts have been hamstrung by solutions that are too expensive and cumbersome to enjoy mainstream adoption.

Much to the chagrin of the security community, passwords have stubbornly remained the only authentication mechanism in place for the vast majority of user accounts. This is likely due to the simplicity and ease of use that passwords provide account holders. When used as the sole factor for authentication, however, passwords present a litany of issues: they are often either hard to remember or easy to guess, users tend to reuse their passwords with many accounts, they are often stored insecurely both at the client and the server, etc. The consensus has long been that there is a compelling need for additional mechanisms to supplement, fortify, or replace this irksome first factor. A multitude of solutions have been proposed over the years, all promising to provide this much-needed additional factor—but for various reasons none have found widespread adoption beyond a relatively small niche user base. The larger world of mainstream users remains unprotected and would greatly benefit from a solution that does not extensively affect existing authentication routines.

In past approaches, authentication decisions are typically made at one point in time based on concurrent data available at that point (e.g., when the user requests authentication in order to perform a particular action, the user enters authentication credentials for one or more authentication factors).

BRIEF DESCRIPTION OF THE DRAWINGS

FIG. 10 is a flow diagram illustrating an exemplary method for contextual authentication with a third application, according to some embodiments.

Figure 1A:
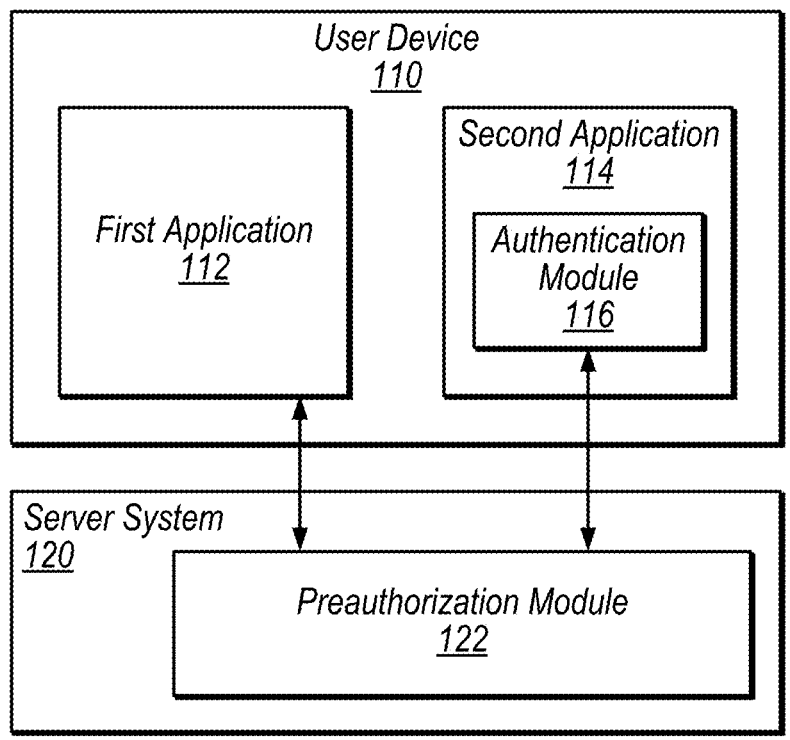
FIGS. 1A-1B are block diagrams illustrating an exemplary preauthentication system, according to some embodiments.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

DETAILED DESCRIPTION

Figure 1B:
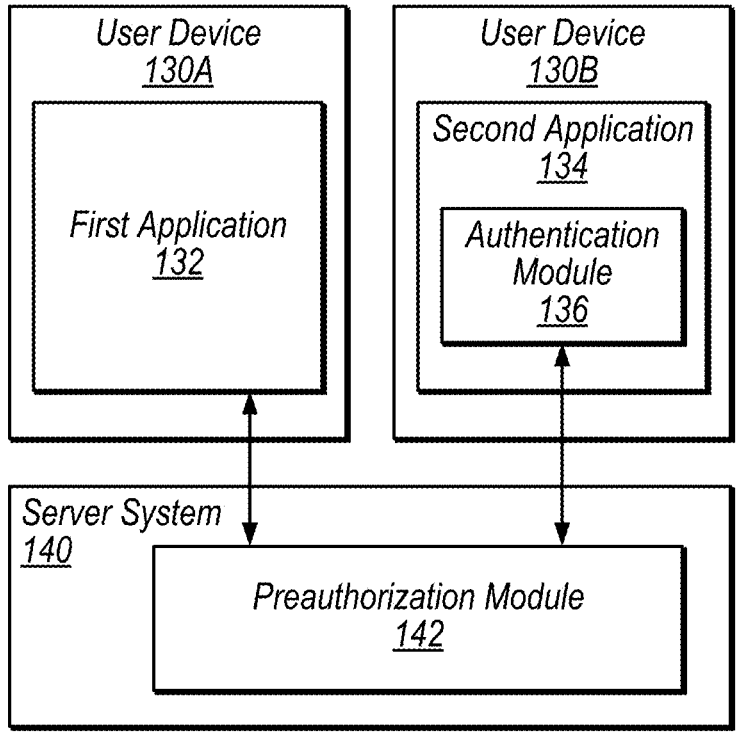
Figure 2:
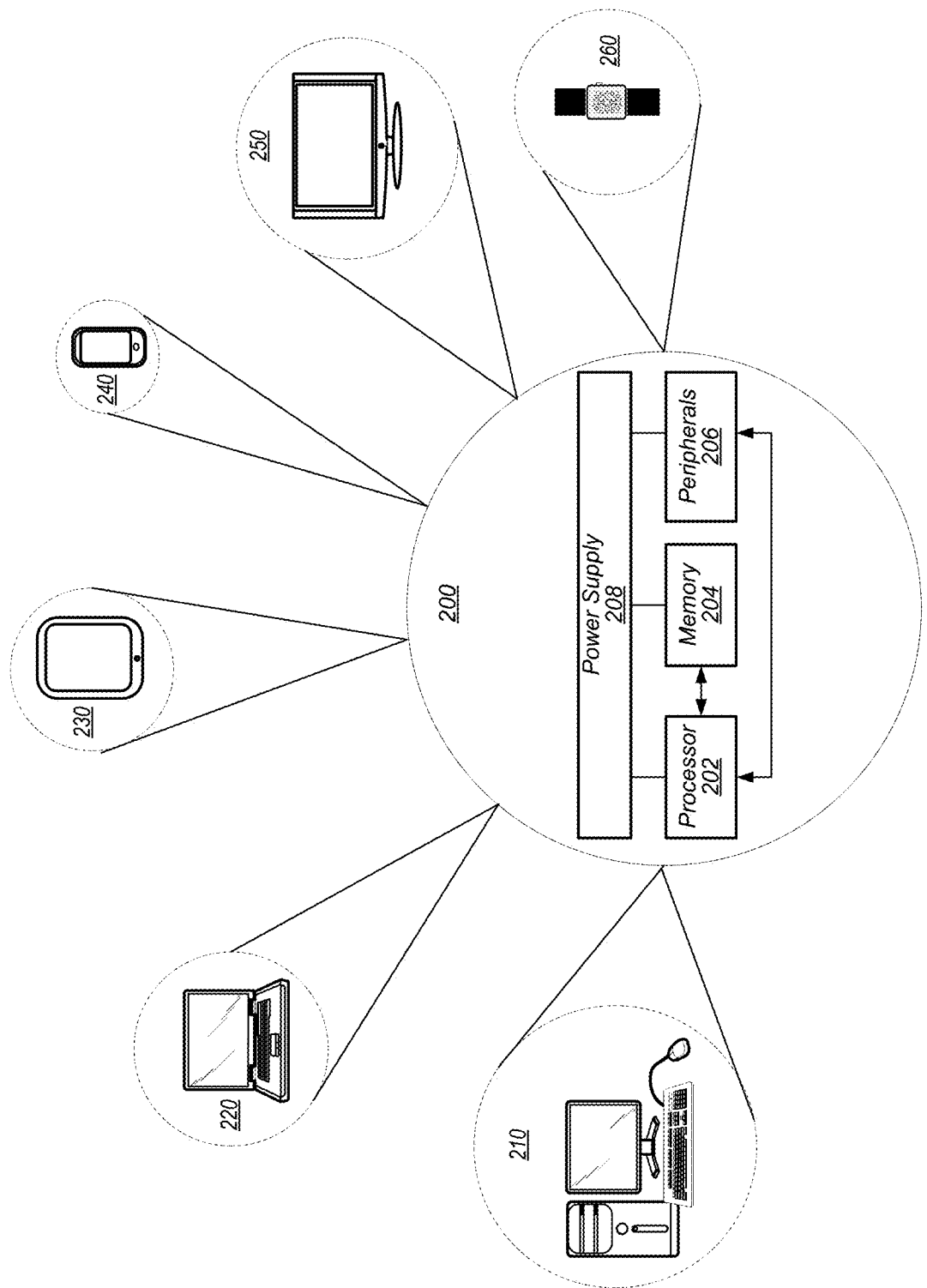
FIG. 2 illustrates various user devices that may be used in an exemplary preauthentication system, according to some embodiments.
Figure 3:
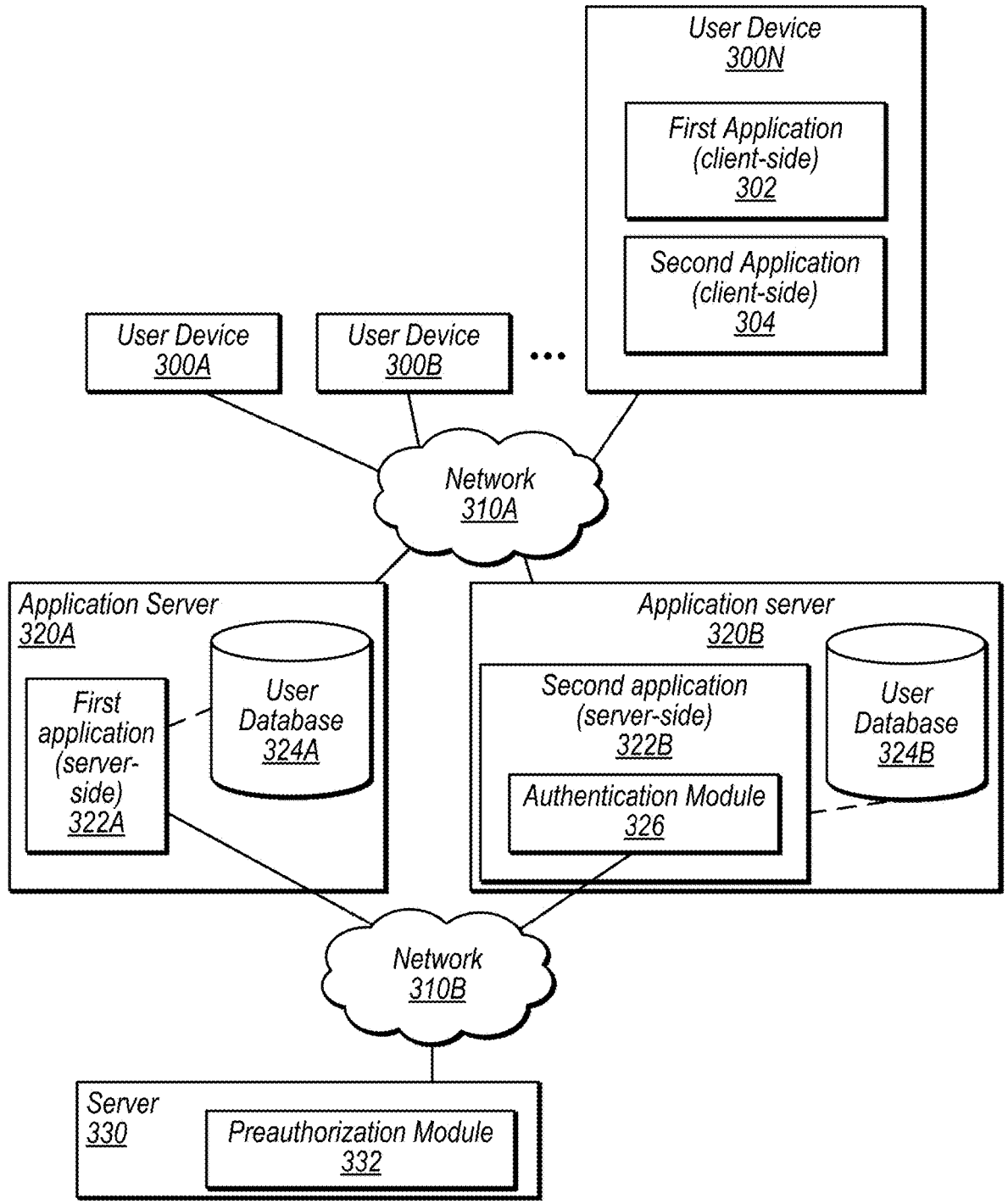
FIG. 3 is a block diagram illustrating an exemplary preauthentication system implemented with split processing between client and server-side applications, according to some embodiments.
Figure 4:
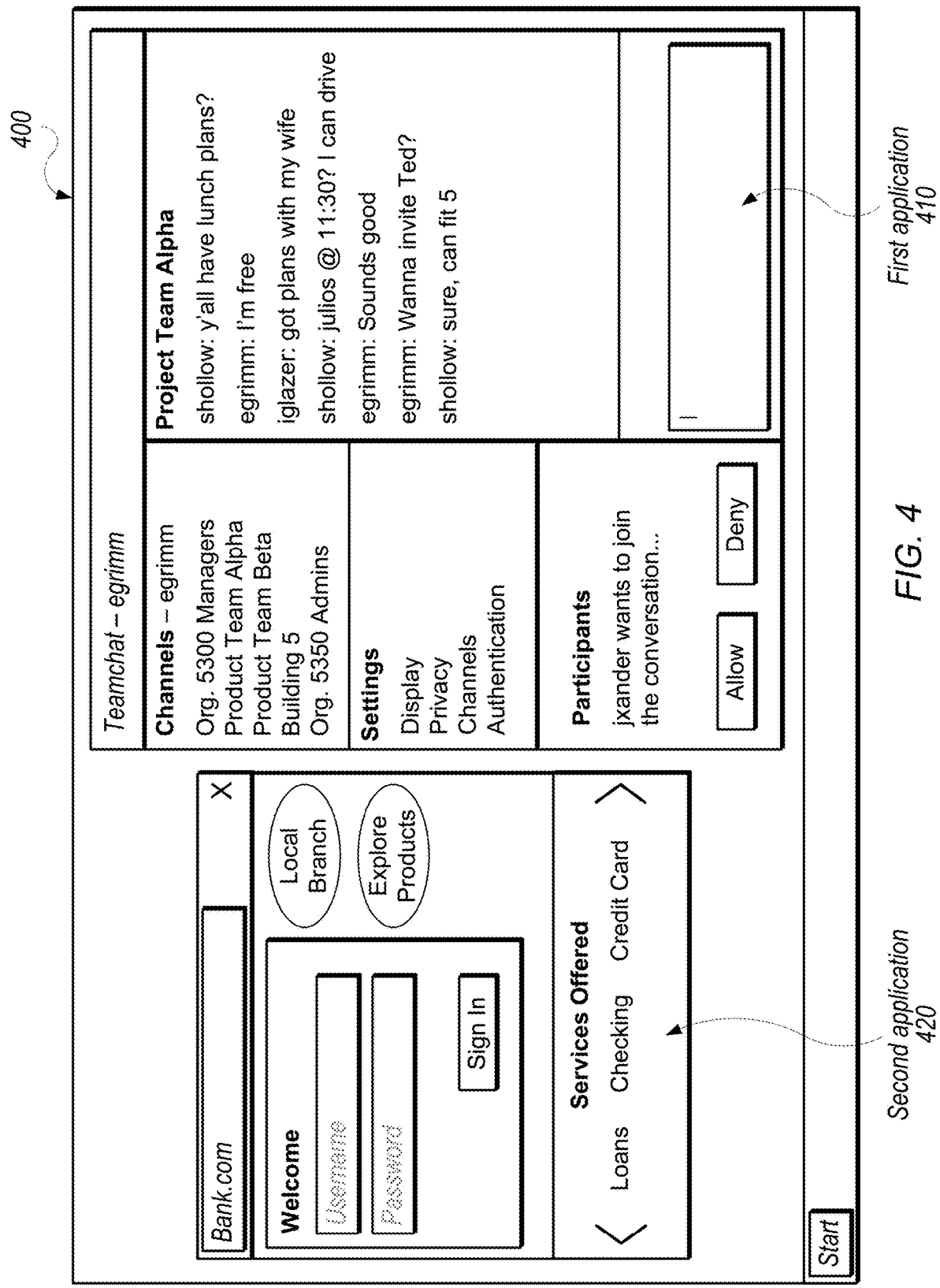
FIG. 4 is a diagram of a user display that shows exemplary graphical interfaces for different first and second applications on a user device, according to some embodiments.
Figure 5:
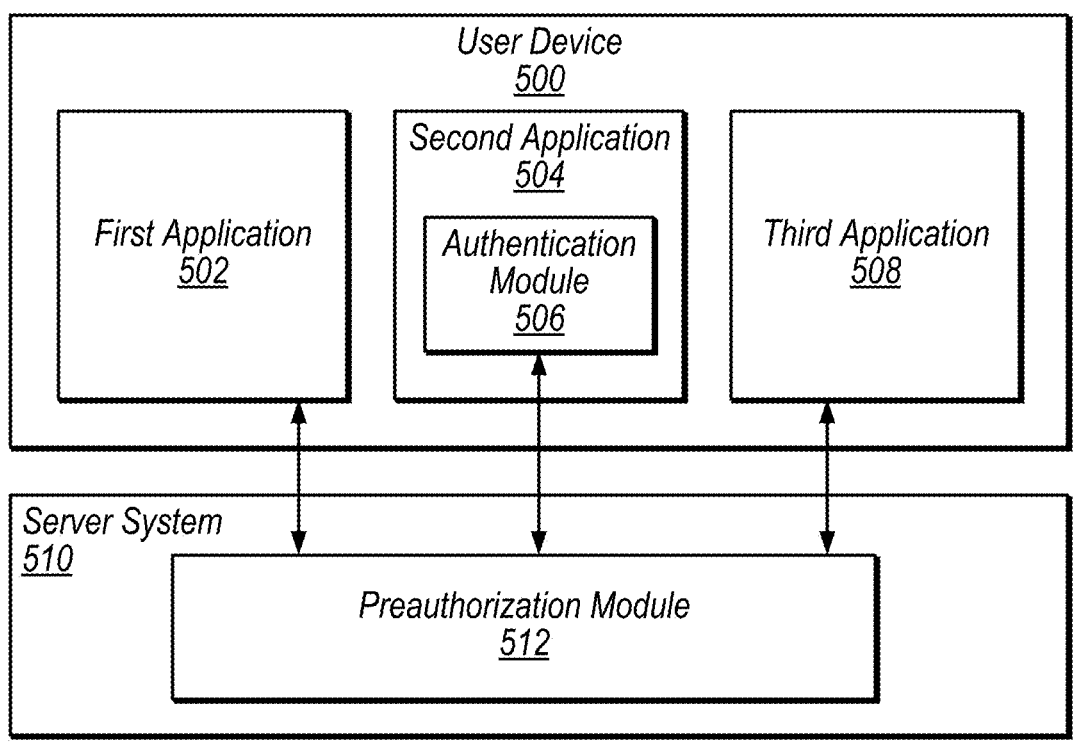
FIG. 5 is a block diagram illustrating an exemplary preauthentication system that uses a third application for authentication, according to some embodiments.
Figure 6:
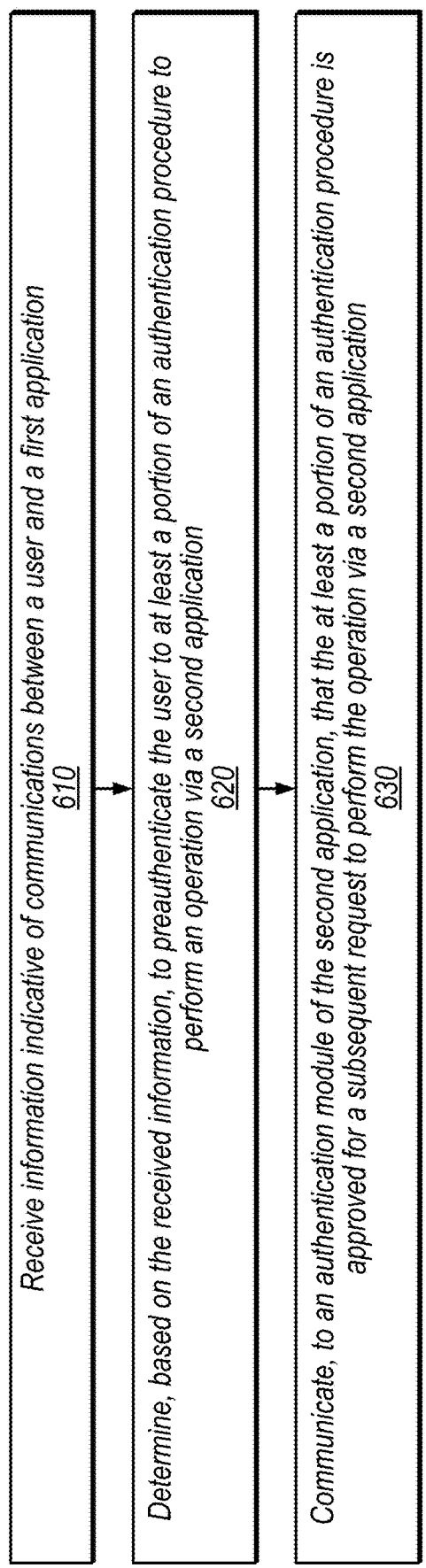
FIG. 6 is a flow diagram illustrating an exemplary server-side method for contextual authentication, according to some embodiments.
Figure 7:
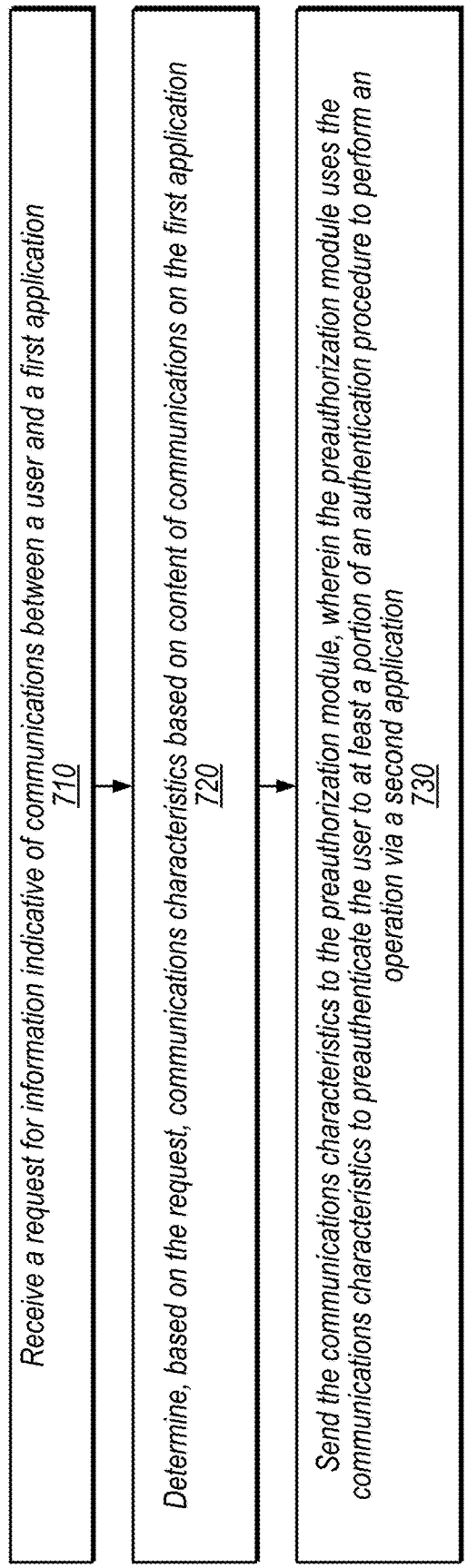
FIG. 7 is a flow diagram illustrating an exemplary client-side method for contextual authentication, according to some embodiments.
Figure 8:
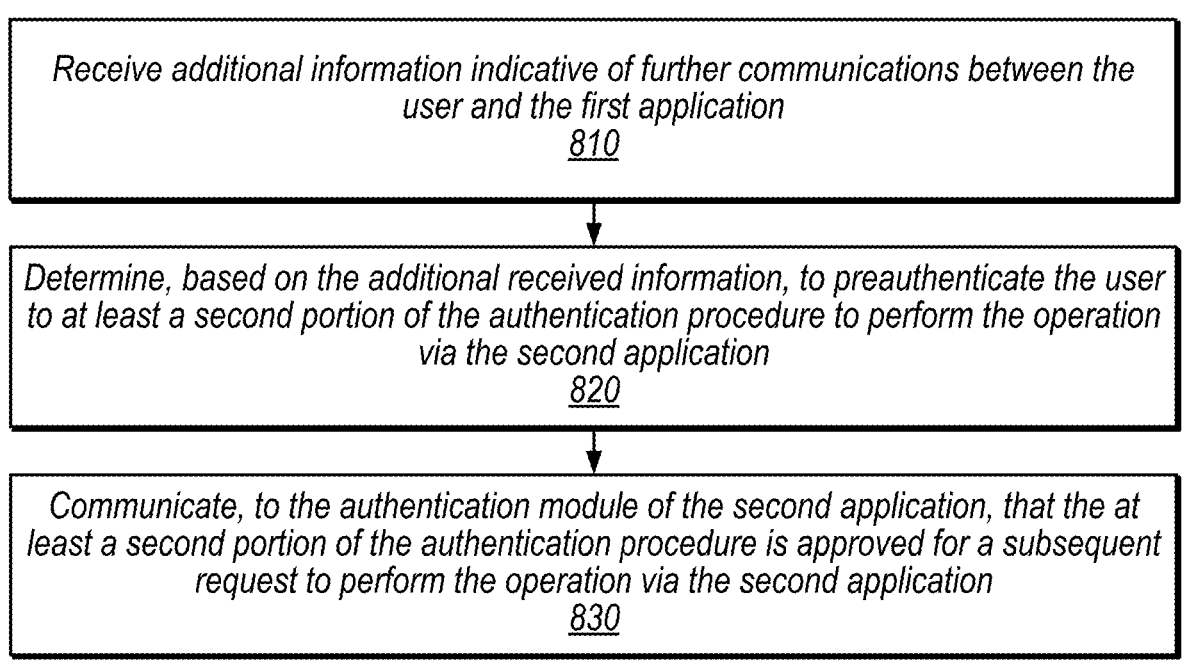
FIG. 8 is a flow diagram illustrating an exemplary method for progressively authorizing levels of authentication based on additional communications, according to some embodiments.
Figure 9:
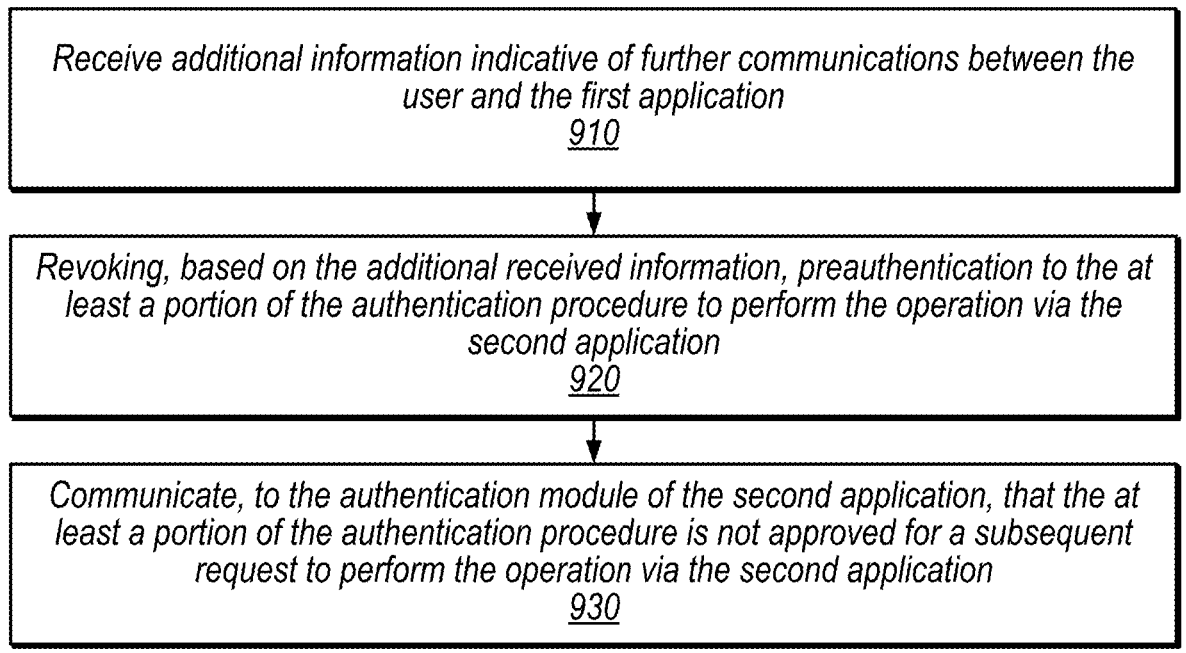
FIG. 9 is a flow diagram illustrating an exemplary method for revoking contextual authentication, according to some embodiments.

This disclosure initially describes, with reference to FIGS. 1-3, an overview of multi-application contextual authentication systems. FIGS. 4-5 show exemplary multi-application preauthentication system embodiments, including a preauthentication system using contextual information from a third application. FIGS. 6-7 show exemplary methods of contextual preauthentication on the server-side and client-side respectively of a networked system. FIGS. 8-9 show exemplary methods for scaling and revoking contextual preauthentication, and FIG. 10 shows an exemplary method for contextual preauthentication with information from a third application. In various embodiments, the disclosed techniques may facilitate improved authentication decisions, transparency to the user, and/or compatibility with user concerns regarding privacy and information security.

In various embodiments, "pre-authentication" may involve gathering information for authentication decisions before the decisions actually need to be made. In various embodiments, the information may be gathered across different applications, e.g., such that a user's activity in a first application, prior to using a second application, may be used for authentication for the second application. Similarly, "post-authentication" techniques may involve gathering information for authentication decisions after the decisions have been made, e.g., to revoke a previous authentication based on later data.

In some cases, contextual authentication techniques leverage the network connectivity of modern mobile devices (such as smartphones, tablet computers, etc.) to provide an automated and unobtrusive contextual authentication factor, which may be used alone or in combination with other factors. In some embodiments, a user is preauthenticated to certain actions on a second application based on the user's communication via a first application. The user's communication via a first application provides contextual information that can be used to preauthenticate a request to perform an action on the second application. Contextual information may include the user's communication itself and/or communications characteristics that are determined from the user's communications. Preauthentication for an action on the second application may apply to a portion of an authentication procedure or to an entire authentication procedure. When the user attempts to perform an action on the second application, the preauthenticated portion of the authentication procedure associated with that action may be approved without explicit user input to the second application (e.g., without providing authentication credentials for the preauthenticated portion).

In some embodiments, the degree of preauthentication progressively increases or decreases with the degree of use on the first application; that is, the user is preauthenticated to greater or fewer portions of an authentication procedure, to perform greater or fewer actions, or to perform actions more or less critical to security, as additional information regarding the user's communication on the first application becomes available. The additional information may be the user's communication itself or communications characteristics that are derived from the user's additional communications. In some embodiments, the preauthentication may also be based on additional factors in addition to communication characteristics. In other embodiments, preauthentication may be revoked as additional contextual information becomes available on the first application.

Contextual authentication may provide numerous advantages over past authentication methods. Contextual authentication increases the types and sources of data that can be used to facilitate an authentication decision. Contextual authentication increases the reliability, adaptability, and verifiability of authentication decisions. For example, contextual authentication can weight information based on the context in which it was collected, such that information collected closer to the point of making the authentication decision has greater effect on the decision. As additional contextual information enables post-authentication evaluation of authentication decisions, contextual authentication also facilitates various methods of machine learning. Contextual authentication enhances the user experience, both in terms of privacy and transparency, as users can select which contextual information is collected, and contextual information enables authentication without requiring user input. For example, contextual authentication may provide the second factor in a multi-factor authentication, absent user input, whereas past methods require the user to provide information manually (e.g. by typing in a passcode or presenting a credential).

Therefore, the disclosed techniques may achieve authentication without significantly burdening the user while, at the same time, considering a broader array of contextual information that facilitates a correct authentication decision. The techniques may be transparent to the user, tied to user input and behavior, and compatible with user concerns regarding privacy and information security.

Overview of Multi-Application Contextual Preauthentication Systems

FIG. 1A is a block diagram illustrating an exemplary preauthentication system, according to some embodiments. In some embodiments, the system is configured to preauthenticate a user to an action on a second application 114 based on information indicative of communications via a first application 112. Note that the disclosed contextual preauthentication systems are included for illustrative purposes but are not intended to limit the scope of the present disclosure. In other embodiments, similar techniques are implemented in networked environments such as various client/server environments, cloud computing environments, clustered computers, etc. One arrangement for elements is shown in FIG. 1A, including user device 110, first application 112, second application 114 containing authentication module 116, and server system 120 containing preauthorization module 122.

As used herein, the term "module" refers to circuitry configured to perform specified operations or to physical non-transitory computer readable media that stores information (e.g., program instructions) that instructs other circuitry (e.g., a processor) to perform specified operations. Such circuitry may implemented in multiple ways, including as a hardwired circuit or as a memory having program instructions stored therein that are executable by one or more processors to perform the operations. The hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

A user may access a first application 112 on user device 110. In some embodiments, user communications to first application 112 are used for preauthentication for the second application 114. These communications may be solely between the user and the first application 112 (e.g., if the first application is a game and the user communications control information to the game), may be between the user and another user (e.g., if the first application is a messaging application), or may be between the user and multiple applications (e.g. if the first application is an add-on to another application receiving user input). All of these types of communications may be described as being performed "via" the first software application.

The first application 112 sends information indicative of user communications via first application 112 to preauthorization module 122, in some embodiments. In some embodiments, preauthorization module 122 requests the information indicative of communications. For example, preauthorization module 122 may request information indicative of communications before the communications occur, after the communications occur, or during the communications. In other embodiments, first application 112 sends information indicative of communications without any request from preauthorization module 122.

Information indicative of communications may be the communications content itself or communications characteristics. For example, for a text message "WOW that is Amazing," the information indicative of the communication could be the text itself and/or information about the text (e.g., the user's interesting use of capital letters). First application 112 may send information indicative of communications via real-time streaming (e.g., as communications are received from the user) or at certain time intervals. In some embodiments, communications content includes raw, unprocessed data according to one or more of various formats. In some embodiments, first application 112 determines communications characteristics from communications content, first application 112 settings or features, or user device 110 settings or features.

Information indicative of communications may be user input to and/or sensory data gathered from various peripheral devices. For example, first application 112 may collect keystroke data from user input to a keyboard. In some embodiments, first application 112 collect communications content only, communications characteristics only, or a combination of communications content and communications characteristics. For example, first application 112 may collect keystroke patterns (e.g. keys or sequences most used), actual keystrokes, or a combination of both. Collecting information indicative of communications from peripheral devices may advantageously broaden the quantity and types of information available for contextual authentication, which facilitates more reliable authentication decisions.

Communication characteristics may include characteristics that are not discernable from the message actually transmitted. For example, an application may track a user's use of autocorrect or autocomplete and send this information as a communication characteristics, even though this information is not discernable from the message text itself, once the auto-correction has been implemented. Autocorrect or autocomplete information could include frequency of use, particular words that are frequently corrected or completed, frequency of rejecting an autocorrect result, etc.

Preauthorization module 122, in some embodiments, receives communications content and determines communications characteristics based on received communications content. For example, an instant messaging application may send preauthorization module 122 raw text data, from which the preauthorization module determines the average character length of user messages. As another example, a teleconferencing application may send preauthorization module 122 raw audio data, from which the preauthorization module determines voice characteristics such as volume and/or pitch. In other embodiments, preauthorization module 122 receives communications characteristics only. As an example, an instant messaging application may send preauthorization module 122 the average number of emoticons per user message, determined voice characteristics, etc. As used herein, "emoticon" is intended to be understood according to its well-understood meaning, which includes any representation used to communicate an attitude, emotion, tone, or idea beyond that communicated in plain text. For example, emoticons may be represented with various keyboard character combinations (e.g. =D), inserted images (e.g. GIF, PNJ, JPEG), or pre-defined images chosen from an emoticon palette.

Exemplary Preauthentication Criteria

In some embodiments, preauthorization module 122 determines, based on the received information indicative of communications, whether to preauthenticate the user to all or a portion of an authentication procedure to perform an operation via a second application 114. For example, the preauthorization module may preauthenticate a user to log-in to a website based on the average character length of user messages on an instant messaging application (and/or other communication characteristics). In some embodiments, the preauthorization module determines whether to preauthenticate an action on the second application by comparing received information to authentication criteria. The authentication criteria may be determined based on past received information for a user. For example, a user may consistently message particular recipients similar content at a predictable timeframe, such as inviting co-workers to lunch around 11:00 AM. Preauthorization module 122 may determine to preauthenticate the user to an action on the second application based on a recent history of similar behavior.

Preauthorization module 122 determines relevant authentication criteria, in some embodiments, based on the materiality of various communications characteristics to the authentication decision. For example, consider an embodiment in which preauthorization module 122 is configured to preauthenticate based on both text syntax and use of emoticons. Preauthorization module may determine that a particular user of an instant messaging application consistently uses formal syntax in messages but uses different types and quantities of emoticons with little consistency. The preauthorization module 122 may then preauthenticate requested actions on second application 114 based on comparing recent syntax to past syntax, but not based on comparing recent emoticons to past emoticons for the particular user, as use of emoticons is a poor indicator of the user's identity. In some embodiments, preauthorization module 122 may give different weights to different criteria, e.g., weighting syntax higher than emoticon use for the example above.

Preauthorization module 122, in some embodiments, is configured to determine whether to preauthenticate a requested action based on multiple authentication criteria. For example, preauthorization module 122 may determine that a user never capitalizes text in instant messages, but commonly includes a particular emoticon when messaging with a particular recipient. Upon receiving communications characteristics from the first application indicating that the user's recent messages to the recipient include both the particular emoticon and capitalized text, the preauthorization module may decide whether to preauthenticate the user based on both emoticon choice and text capitalization. The combination of criteria may be flexible (e.g., by weighting certain characteristics more heavily and preauthenticating if an overall combination of characteristics meets a threshold) or may use binary rules (e.g., authentication is not performed unless each of multiple criteria or met) or some combination thereof.

Preauthorization module 122 is configured to determine authentication criteria in some embodiments based on communications characteristics for a population of users. For example, preauthorization module 122 may determine that users in the southern United States often use "y'all" in messages, and preauthorization module 122 may determine that a particular user's device, despite using "y'all" in past communications, recently used "you guys" in several messages. The preauthorization module may determine not to preauthenticate the particular user to an action on second application 114 because recent communications characteristics do not match patterns for the relevant sample population.

Preauthorization module 122 determines whether to preauthenticate the user's action on the second application according to various algorithms for machine learning, in some embodiments. As used herein, the term "machine learning" is intended to be understood according to its well-understood meaning, which includes decision tree learning, rule-based learning, cluster analysis, support vector machines, association rule learning, genetic algorithm learning, and neural network learning, among others. For example, preauthorization module 122 may perform a random forest analysis on training data to determine which communications characteristics are material, then determine whether to preauthenticate a user's action on second application 114 based on the material communications characteristics.

Preauthorization module 122, in some embodiments, is configured to communicate to authentication module 116 that the user is preauthenticated to all or a portion of an authentication procedure required to perform an operation on the second application. For example, authentication module 116 may allow a user to perform an action on second application 114 without any user input to an authentication procedure. In other embodiments, preauthorization module 122 communicates communications characteristics to authentication module 116, and authentication module 116 determines whether to preauthenticate the user to all or a portion of an authentication procedure to perform an operation via a second application 114. For example, preauthorization module 122 may send authentication module 116 the average message length and average sentence length of a user's messages on first application 112, and authentication module 116 may determine whether to authenticate a user's action on second application 114 based on this data.

Exemplary Preauthentication System Implementations

The various applications and modules disclosed herein may be implemented in hardware, e.g. as dedicated circuitry, in software, e.g. as an executable computer program, or otherwise in some embodiments. For example, first application 112 may be various software applications (e.g. an instant messaging application, an email application, a teleconferencing application, a videoconferencing application, or a web browsing application). In some embodiments, first application 112 and second application 114 operate on the same device. For example, the user may open an instant messaging application and a web browser on the same laptop. In some embodiments, different circuitry or devices provide the functionality for the first and second applications, but the user interfaces with both first application 112 and second application 114 on the same user device 110. For example, a laptop user may open a first application, a social network executed on a cloud-based network of servers, then open a second application, a spreadsheet tool, executed locally on the laptop.

First application 112 may be transparent to the user in some embodiments. For example, first application 112 may run in the background of user device 110 without a visual interface to the user. As another example, first application 112 may be a monitoring add-on to an instant messaging software, such that user input to instant messaging software is collected by first application 112 without notifying the user. In some embodiments, first application 112 may collect information indicative of communications from other applications. For example, a first monitoring application may collect information indicative of communications from user's interaction with both a web browser and an instant messaging application. In some embodiments, the user may initially authorize first application 112 to collect information indicative of communications from user input to various peripheral devices. In other embodiments, first application 112 may collect information without explicit initial user input authorizing collection. In some embodiments, first application 112 may notify user when it collects information indicative of communications. As discussed above, information indicative of communications may be the communications content itself or communications characteristics. In some embodiments, the user may initially authorize first application 112 to collect only communications characteristics, only communications content, or some combination of communications content and communications characteristics. User approval of transparent monitoring of particular communications may provide the advantages of broadening sources of information for contextual authentication (e.g. from peripheral devices), protecting user privacy, minimizing interference with user activity, and providing users with control over which information indicative of communications is shared more broadly. Moreover, enabling the user to update information collection settings allows user preferences with respect to privacy to change over time, in some embodiments.

First application 112 is a real-time communication platform, in some embodiments. On a real-time communication platform, user can send and receive data at will and communications are delivered immediately. The communication may be one-to-one, one-to-many, or many-to-many. Examples of real-time communications platforms include instant messaging, teleconferencing, video conferencing, and web conferencing.

Authentication module 116 may be implemented in hardware, e.g. as dedicated circuitry, in software, e.g. as an executable computer program, or otherwise in some embodiments. For example, authentication module 116 may contain program instructions, as part of enterprise application software, that requires a second authentication factor after a user enters a password. As another example, authentication module 116 may be a physical device, such as a contactless card reader. In some embodiments, preauthentication by preauthorization module 122 deactivates authentication module 116. In other embodiments, authentication module 116 automatically approves a portion or all of an authentication procedure based on preauthentication by preauthorization module 122.

Preauthorization module 122 may be implemented in hardware, e.g. as dedicated circuitry, in software, e.g. as an executable computer program, or otherwise in some embodiments. For example, preauthorization module 122 may contain program instructions, as part of authentication software, that compare received information to authentication criteria and communicate an authentication decision. In some embodiments, preauthorization module 122 receives information indicative of communications between multiple first applications and multiple users. In some embodiments, preauthorization module 122 uses only a given user's information in making a contextual authentication determination for that user. For example, preauthorization module 122 may receive instant messaging information for thousands of users, but determine whether to authenticate a particular user based only on that user's information. In other embodiments, preauthorization module 122 uses information from multiple applications and or users in making an authentication decision for a given user. For example, preauthorization module 122 may determine, based on a large, anonymized dataset for a user population, that average word length and average message length are two communications characteristics most predictive of user identity. Preauthorization module may then determine whether or not to preauthenticate a specific user to a requested action on a second application based on comparing the user's average word length and average message length to two authentication criteria.

In some embodiments, preauthorization module 122 is configured to perform post-authentication evaluation of contextual authentication decisions. For example, upon learning that a user should not have been preauthenticated to a particular action on a second application (e.g. via a fraud alert system), preauthorization module 122 may adjust one or more parameters by which it makes authentication determinations (e.g., parameters that weight certain communication characteristics, parameters regarding which types of communication characteristics to utilize for a particular user, etc.). Preauthorization module 122 may receive information indicating that a preauthentication should not have been performed from numerous sources, including fraud detection systems, additional user communications on a first application, user feedback, third-party reporting, manual monitoring, and law enforcement, among others. For example, a pop-up window in a first instant messaging application may ask the user whether the user recently accessed information in a second application. If the user response to the pop-up notification indicates that the user did not access a second application, preauthorization module may revoke an existing preauthentication, on the basis that it should not have been granted, and adjust the parameters by which it makes authentication determinations. Preauthorization module 122 may update its preauthentication determination process by changing authentication criteria, changing the process by which it calculates authentication criteria, or changing the data it compares to authentication criteria, among others. Post-authentication evaluation of contextual authentication decisions may have the advantage of improving the accuracy of contextual authentication decisions, protecting user information from fraudulent access, and/or notifying the rightful user of attempts to gain unauthorized access.

Several elements in the embodiment shown in FIG. 1A may include conventional, well-known elements that need not be explained in detail here. For example, user device 110 may be a desktop personal computer, workstation, laptop, PDA, cell phone, or any other computing device capable of interfacing directly or indirectly to the Internet or other network connection. Server system 120 may be a single computing device or multiple computing devices (e.g. a distributed system connected over a network such as the internet), in some embodiments. For example, server system 120 may be a single computer with self-contained processing and memory, a cloud computing environment, multiple clustered computers, etc.

In some embodiments, functionality described as being separately performed by user device 110 and server system 120 may be implemented using a single device, such as a desktop personal computer, workstation, laptop, PDA, cell phone, or any other computing device. For example, first application 112 may be an instant messaging application executed on a user's laptop, preauthorization module 122 may be monitoring software executed locally on user's laptop, and second application 114 may be an Internet browsing application on the same laptop. In other embodiments, various functionality described herein as being performed by a single device may be distributed among multiple devices or systems. For example, preauthorization module 332 may be implemented by multiple devices in order to separate storage and processing of potentially sensitive user data.

In some embodiments, the user may define settings in preauthorization module 122 that determine what information indicative of communications preauthorization module 122 requests from first application 112. In some embodiments, the user may define that preauthorization module 122 request different information from different applications used as first application 112. For example, a user may define that preauthorization module 122 requests the time at which messages are sent from an instant messaging application and average email length from an email application. The instant messaging application and email application are two examples of possible first applications. In some embodiments, the user may define settings in first application 112 that determine what information indicative of communications first application 112 sends to preauthorization module 122. For example, a user may define settings that allow first application 112 to send communications characteristics, such as average character length of text messages, but not communications content, such as the text messages, to preauthorization module 122.

FIG. 1B is a block diagram illustrating an exemplary preauthentication system in which a first application 132 and a second application 134 are on separate user devices 130A and 130B, respectively. In some embodiments, user devices 130A and 130B may be in proximity to one another. For example, the user may use device 130A, a mobile device, for instant messaging while concurrently using device 130B, a laptop, for web browsing at the same location. In some embodiments, user devices 130A and 130B may be located remotely to one another. For example, the user may call a customer using device 130B, a company-issued mobile device, while remotely logged-on to device 130A, a desktop computer. In various embodiments, techniques described herein in scenarios where the first and second applications are on the same device may be used in contexts such as FIG. 1B where the applications are on different devices.

The authentication procedure to perform an operation via second application 114 may be a single factor authentication, a portion of a multi-factor authentication, or both a first and a subsequent factor of a multi-factor authentication. The disclosed techniques may be used to enable various automated multi-factor authentication embodiments, such as those discussed in U.S. patent application Ser. No. 14/849,323, U.S. patent application Ser. No. 14/849,352, and U.S. patent application Ser. No. 14/849,312.

FIG. 2 contains various user devices that may be used in an exemplary preauthentication system. User device 200 contains power supply 208, processor 202, memory 204, and peripherals 206. As used herein, peripherals is intended to be understood according to its well-known meaning in the art, which includes devices such as a computer mouse, keyboards, data storage devices, microphones, image scanners, cameras, charging stations, and speakers, among others. User devices include a desktop personal computer 210, laptop 220, tablet 230, mobile device 240, remote terminal 250, and wearable device 260.

Exemplary Distributed Processing Embodiments

FIG. 3 illustrates an exemplary split processing environment in which a contextual preauthentication system may be implemented, according to some embodiments. The embodiment contained in FIG. 3 includes user devices 300A-300N, first application 302 (client-side), second application 304 (client-side), application servers 320A and 320B, first application 322A (server-side), second application 322B (server-side) containing authentication module 326, user databases 324, and server 330 containing preauthorization module 332. A user may access a first application 302 or a second application 304 on user devices 300. In some embodiments, first application 302 receives information indicative of communications from user input. Implementation of contextual authentication in a split processing environment may provide numerous advantages, including: enabling contextual authentication across numerous remotely located devices, enabling contextual authentication for web-based or networked applications, separation of information gathering and information processing (e.g. to enable user anonymity and keep user communication content secret), and/or consolidation of data for multiple users to determine material communications characteristics for various populations of users.

Several elements in the system shown in FIG. 3 may include conventional, well-known elements that need not be explained in detail here. User devices 300 may execute an HTTP client, e.g., a browsing program, such as Microsoft's Internet Explorer™ browser, Netscape's Navigator™ browser, Opera's browser, or a WAP-enabled browser in the case of a cell phone, PDA or other wireless device, or the like, allowing a user (e.g., subscriber of a CRM system) of user devices 300 to access, process, and view information and pages available to it from application servers 320 over network 310. Each user device 300A-300N may include one or more user peripheral devices, such as a keyboard, a mouse, touch screen, pen or the like, for interacting with a graphical user interface (GUI) provided by the browser on a display monitor screen, LCD display, etc. in conjunction with pages, forms and other information provided by application servers 320 or other systems or servers. The present invention is suitable for use with the Internet, which refers to a specific global internetwork of networks. It should be understood, however, that other networks may be used instead of the Internet, such as an intranet, an extranet, a virtual private network (VPN), a non-TCP/IP based network, any LAN or WAN or the like.

In some embodiments, each user device 300A-300N and its components are operator configurable using applications, such as a browser, that include computer code executable on one or more processing elements. Similarly, in some embodiments, application servers 320 (and additional instances of application servers, where more are present) and their components are operator configurable using application(s) that include computer code executable on one or more processing elements. Thus, various operations described herein may be performed by executing program instructions stored on a non-transitory computer-readable medium and executed by one or more processing elements. The program instructions may be stored on a non-volatile medium such as a hard disk, or may be stored in any other volatile or non-volatile memory medium or device as is well known, such as a ROM or RAM, or provided on any media capable of staring program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C+, HTML, Java, JavaScript, or any other scripting language, such as VBScript.

According to some embodiments, each application server 320A-320B is configured to provide web pages, forms, applications, data, and/or media content to user devices 300 to support the access by user devices 300 to first application 302, second application 304, and other applications, where more are present. If more than one application server 320 is used, they may be located in close proximity to one another (e.g., in a server farm located in a single building or campus), or they may be distributed at locations remote from one another (e.g., one or more servers located in city A and one or more servers located in city B). As used herein, application servers 320 may include one or more logically and/or physically connected servers distributed locally or across one or more geographic locations. Additionally, the term "server" includes a computer system, including processing hardware and process space(s), and an associated storage system and database application as is well known in the art. It should also be understood that "server system" and "server" are often used interchangeably herein. Similarly, the databases described herein can be implemented as single databases, a distributed database, a collection of distributed databases, a database with redundant online or offline backups or other redundancies, etc., and might include a distributed database or storage network and associated processing intelligence.

The user accesses first application 302 and second application 304 on the same user device 300N, in some embodiments. In other embodiments, the user accesses first application 302 and second application 304 on different ones of user devices 300 (e.g., the second application 304 may be executed on user device 300B). Similarly, in some embodiments, first application 322A and second application 322B are provided by different application servers 320A and 320B, respectively. In other embodiments, a single application server provides the server-side functionality for both first application 322A and second application 322B.

User devices 300 and server 330 communicate with application servers 320 via networks 310, in some embodiments. Application servers 320 provide user devices 300 with web-based access to client-side first application 302 and second application 304, according to some embodiments. In some embodiments, server-side first application 322A and second application 322B access user database 324A and 324B, respectively, and provide relevant user information to user devices 300.

First application 302, in some embodiments, sends information indicative of communications via network 310A to application server 320A. In some embodiments, server-side first application 322A sends information indicative of communications to preauthorization module 332 via network 310B. Network 310A and 310B may or may not be the same network.

Preauthorization module 332, in some embodiments, receives communications content and determines communications characteristics based on received communications content. In other embodiments, preauthorization module 332 receives communications characteristics only.

Client-side first application 302 may anonymize information indicative of communications, according to some embodiments illustrated in FIG. 3. Anonymized information may be communications content or communications characteristics. For example, first application 302 may determine communications characteristics from user input, then send those communications characteristics to application server 320A accompanied by an identifier disassociated from the user. First application 302 may hash or encrypt the identifier to achieve anonymity before sending. For example, first application 302 may send communications characteristics (e.g. average sentence and word length) to preauthorization module 332, along with a hash converting identifying information (e.g. name Josh Alexander) to a numeric identifier (e.g. 1111). When user Josh Alexander attempts to perform an action via second application 304, the second application may hash identifying information stored locally on user device 300N and send the hashed identifier 1111 to preauthorization module 332, which retrieves relevant communications characteristics based on the identifier. As used herein, hashing is intended to be understood according to its well-understood meaning, which includes mapping input data to an output alphanumeric data set of a fixed size such that it is difficult to reconstruct the input data from the hash output. Exemplary hashing techniques may include, without limitation: universal hashing and/or various cryptographic hash functions (e.g. MD5, SHA-1), among others. As used herein, encryption is intended to be understood according to its well understood meaning, which includes generating cipher text based on input data using an encryption key. Examples of encryption techniques include, without limitation: symmetric encryption (e.g. AES, DES, Triple DES, Blowfish, Twofish) and asymmetric encryption (e.g. RSA, ECC), among others. In some embodiments, the first application may prompt the user for input approving anonymization of user data. Anonymizing user data may advantageously protect private user information, encouraging more users to opt in to sending information for contextual authentication. Anonymizing user data may also enable the determination of communications characteristics for populations of users. In some embodiments, the determination of communications characteristics for populations of users may inform authentication decisions for individual users. For example, a preauthorization module may determine, based on information collected from a broad population, that average word length is the communication characteristic most predictive of user identity. When an individual user later requests to perform an action on a second application, the preauthorization module may use average word length as the primary authentication criteria, among others.

Information indicative of communications may be the communications content itself or communications characteristics. For example, communications content may include text, audio and/or video files. Communications content may be sent via real-time streaming or at certain time intervals. Communications content may include raw, unprocessed data, according to various formats. For example, communications content may be sent as ASCII, HTML, or XML formats, among others. Information indicative of communications may be sent according to various methods. For example, information may be compressed, hashed, and/or encrypted.

In some embodiments, communications characteristics are data that may be determined from communications content or from the features and settings of first application 112 or user device 110 generally. For example, communications characteristics may include data determined from communications content, for example, vocabulary, syntax, diction, punctuation, font, use of emoticons, volume, tone of voice, talking speed, frequency of words that connote strong emotion, and/or image characteristics (e.g., camera capabilities, lighting, color, focus, environment), among others. In some embodiments, communications characteristics include secondary features that are not directly based on the content of communications, such as time of day, communications medium, frequency of communications, participants, keystroke patterns (e.g., overall typing speed, frequent mistyping of certain characters, use of autocorrect, etc.), duration, and/or location of communications, among others. In some embodiments, communications characteristics include data determined from application or device settings, devices, or channels used to communicate, for example user profile, numerical device identifier, IP address, WiFi or Bluetooth status, among others. In some embodiments, communications characteristics include data determined from biometrics, for example fingerprint information, facial recognition data, voice recognition data, or retinal scan data contained in communications content. In some embodiments, communications characteristics may include links to external content or features of external content incorporated in communications content (e.g. use of hyperlinks or links to GIFs). In some embodiments, communications characteristics include a combination of data determined from communications content, secondary features of communications, biometrics, external links, and/or application or device settings, devices, or channels used to communicate. For example, communications characteristics may include both the average message length, the frequency of messages and the device used to send messages.

Exemplary User Interface to Applications of a Contextual Authentication System

FIG. 4 is a diagram illustrating a display device showing exemplary user interfaces for a first application 410 and second application 420. In the illustrated embodiment, the first application 410 is an instant messaging application, which displays user's messages to other users of the first application, and the second application 420 is a web browser application that displays a webpage. These types of application are shown for purposes of illustrated and are not intended to limit the scope of applications used in other embodiments.

In some embodiments, a user may define settings in first application 410 that determine what information indicative of communications first application 410 sends to a preauthorization module (e.g. preauthorization module 122, 142, or 332). For example, the user may allow first application 410 to send communications characteristics (e.g. average message length, message timestamp, message recipient, message channel) but not communication content (e.g. actual message text). In some embodiments, first application 410 sends information indicative of communications via first application 410 without user input.

A preauthorization module uses information received from first application 410, in some embodiments, to determine whether to preauthenticate the user to part of an authentication procedure to perform an operation via second application 420. For example, the preauthorization module may determine, based on capitalization at the beginning of user's messages, to preauthenticate the user to access transaction records at Bank.com via second application 420, without providing a second authentication factor in addition to a password. In the illustrated example, consider that user "shollow" has not capitalized any messages in first application 410. In this scenario, the preauthorization module may authenticate that the person entering messages as "shollow" is actually shollow based on that user's consistent lack of capitalization in the past. Therefore, the preauthorization module may preauthorize at least a portion of an authentication process for Bank.com.

Other examples of communications characteristics that could be garnered from the illustrated example include: the participants to the conversation, the amount of time multiple users are typing at once, the average delay between messages, use of regional terms such as "y'all" and "Wanna," use of symbols such as "@" frequency of a user sending multiple messages without an answer (e.g., egrimm's two consecutive messages), etc.

In some embodiments, first application 410 may notify the user as it collects communications content and/or communications characteristics. For example, a pop-up window within first application 410 may notify the user that the user's communications in application 410 are being used for preauthentication of access to other applications. First application 410 may require user approval before collecting information. For example, a pop-up window within first application 410 may launch when the user opens first application 410 (and/or when the second application requires preauthentication), requesting user approval to use the user's communications for preauthentication decisions. User approval may be input by the user one time (e.g. in settings for the first application), at intervals (e.g. every time the user opens first application), or every time the first application collects information. User notification and requests for user approval, such as those described above, may occur through second application 420 in some embodiments. For example, upon requesting access to financial records in a second web browsing application, the user may be notified by the second application that access is preauthenticated based on the user's communications via a first instant messaging application.

The preauthorization model communicates the preauthentication decision, in some embodiments, to second application 420. Second application 420 allows the user to perform a subsequently requested operation without any user input to the preauthenticated portion of the authentication procedure, in some embodiments. For example, second application 420 may typically require the user to both provide a user password (first factor) and text code from a mobile device (second factor) before the user can access transaction records. If the preauthorization module communicates that the user is preauthenticated to the second factor, the user may access transaction records without providing a text code from a mobile device. Any of various different portions of an authentication procedure may be preauthenticated, including, without limitation: an entire procedure, username, password, biometric authentication (e.g., fingerprint or facial recognition), out-of-band codes, secret questions and answers, etc.

In some embodiments, the preauthorization module approves progressive levels of preauthentication, allowing the user to perform more actions or actions more critical to security or perform the same actions with less manual entry of authentication credentials, as it receives additional information indicative of further communications via first application 410. For example, second application 420 may typically require the user, in addition to providing both a user password (first factor) and text code from a mobile device (second factor) before the user can access transaction records, to provide an administrative passcode (third factor) before the user can modify transaction records. A preauthorization module may have previously preauthenticated the user to access transaction records based on capitalization in user messages via first application 410. If the preauthorization module receives additional communications characteristics, for example indicating that additional user messages are an average length, the preauthorization module may, on the basis of receiving additional communications characteristics, approve the user to modify transaction records without providing an administrative passcode.

In some embodiments, a preauthorization module (e.g. preauthorization module 122, 142, or 332) preauthenticates a user to perform an action on a second application based on information indicative of communications via more than just the first application. For example, the preauthorization module may receive text data from a first instant messaging application and streaming audio data from a third teleconferencing application, then decide to preauthenticate the user to part of an authentication procedure to perform an action via a second web browsing application based on both the use of emoticons in text data and voice recognition information extracted from audio data.

Exemplary Multi-Application Contextual
Preauthentication System Embodiments

FIG. 5 is a block diagram illustrating an exemplary preauthentication system that uses a third application for authentication, according to some embodiments. The embodiment shown in FIG. 5 includes a server system 510 that implements preauthorization module 512 and user device 500 which implements first application 502, second application 504 (including authentication module 506), and third application 508, and. The applications shown in FIG. 5 may be configured similarly to various other applications described herein.

Although first application 502, second application 504, and third application 508 are shown as located on the same device in the illustrated embodiment for purposes of illustrations, one or more of the applications may be located on another device in other embodiments. For example, first application 502 may be an instant messaging application on a mobile device, second application 504 may be a web browsing application on a desktop computer, and third application 508 may be a videoconferencing application on laptop computer.

In some embodiments, preauthorization module 512 receives information indicative of communications between a user and first application 502 and third application 508 from first application 502 and third application 508, respectively. Preauthorization module 512 may request information from first application 502 and third application 508, or first application 502 and third application 508 may provide information indicative of communications without prompting by the preauthorization module. In some embodiments, the preauthorization module receives information from the first application, then requests information from the third application to validate or contradict an authentication decision based on the information received from the first application. For example, preauthorization module 512 may decide to authenticate a user to an log-in to a website on the second application based on text information received from a first email application, then request images from a third videoconferencing application to validate the user's identity.

Exemplary Methods

FIG. 6 is a flow diagram illustrating a server-side method for contextual authentication, according to some embodiments. The method shown in FIG. 6 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired.

At 610 in the illustrated embodiment, a preauthorization module (e.g. preauthorization module 122, 142, or 332) receives from first application (e.g. first application 112, 132, or 302) information indicative of communications via the first application. The information may be transmitted internally within a user device (e.g. between two software applications), between two devices via a short-range channel (e.g. Bluetooth), between two devices over a network (e.g. a LAN or the Internet), or by other methods. The information may be raw data (e.g., communications content) or may be at least partially processed (e.g., to determine characteristics of the communications content).

At 620 in the illustrated embodiment, the preauthorization module determines, based on the received information, to preauthenticate the user to at least a portion of an authentication procedure to perform an operation via a second application. As discussed above, the received information may be communications characteristics or communication content. The authentication procedure, in some embodiments, may be a single factor authentication, a multi-factor authentication, strong authentication, or continuous authentication, among others. For example, a multi-factor authentication may require the user to provide a password and swipe a security token to obtain entry to a facility. In some embodiments, all or part of the authentication procedure may require digital authentication (e.g. a password provided via electronic communication). In some embodiments, all or part of the authentication procedure may require physical authentication (e.g. use of a security token or card, presentation of a biometric sample).

A portion of an authentication procedure may be any number of authentication steps, including all steps, performed as part of the authentication procedure, in some embodiments. The preauthenticated portion may be a first, second, or subsequent factor in a multi-factor authentication. For example, an authentication procedure may require a user to present both a password and a fingerprint scan, but a preauthorization module preauthenticates the password, such that only the fingerprint scan is needed to complete the procedure. In some embodiments, the preauthenticated portion is a factor provided by one user in a multi-factor authentication requiring factors from multiple users (e.g. multiple users enter separate passwords to jointly access a database). In some embodiments, the steps performed as part of the authentication procedure occur concurrently and/or without a consistent ordering. For example, a continuous authentication may require a user device in a particular location at a particular temperature over a particular timeframe, and preauthentication may approve the location portion of the continuous authentication, such that approval of subsequent requests to perform an action only requires the user device be at a particular temperature over the timeframe. The preauthenticated portion of an authentication procedure may authenticate a user based on information the user provides, a device or object the user possesses, information obtained about the user (e.g. location), or user characteristics (e.g. biometric identifiers), among others. For example, user authentication may require the answer to a security question (e.g. What is your date of birth?) or collecting data from a user device (e.g. tracking current velocity from a mobile device).

The operation performed via the second application, in some embodiments, may be any of various restricted actions. One example is access to secure information or systems. For example, a user completing the authentication procedure may access a secure database or a secure communications channel. In some embodiments, authentication may enable the user to modify information or systems already accessed. For example, an authenticated user may be able to write to, copy, transmit or otherwise modify information that was previously read-only. In some embodiments, the operation may be a physical action. For example, a user completing the authentication procedure may access a physical location or use a previously disabled device (e.g. an authenticated user may operate heavy machinery after authentication demonstrates his qualifications, including a safety certification).

At 630 in the illustrated embodiment, the preauthorization module communicates, based on the determination, the preauthentication to an authentication module of a second application. The communicated preauthentication may be sent internally within a user device (e.g. between two software applications), between two devices via a short-range channel (e.g. Bluetooth), between two devices over a network (e.g. a LAN or the Internet), or by other methods. The authentication module may apply the preauthentication to a portion of an authentication procedure such that no user input to that portion of the procedure is required. In various embodiments, the authentication module may verify the identity of the preauthorization module, e.g., using elliptic curve cryptographic techniques.

Note that although FIG. 6 is described as a server-side embodiment and FIG. 7 as a client-side embodiment, similar techniques may be implemented among any of various different devices via a network and/or among elements of a single device, as discussed herein.

FIG. 7 is a flow diagram illustrating a client-side method for contextual authentication, according to some embodiments. The method shown in FIG. 7 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired.

At 710 in the illustrated embodiment, a first application (e.g. first application 112, 132, or 302) receives a request, from a preauthorization module (e.g. preauthorization module 122, 142, or 332), for information indicative of communications via the first application. The request may be sent internal to a user device (e.g. between two software applications), between two devices via a short-range channel (e.g. Bluetooth), between two devices over a network (e.g. a LAN or the Internet), or by other methods. In some embodiments, the request specifies that the first application send communications content to the preauthorization module. The request may specify particular communications content requested or particular communications content not requested. For example, the preauthorization module may request that a first videoconferencing application send raw audio data, but not send raw video data. As another example, the preauthorization module may request that a first instant messaging application send raw text data sent to a particular recipient, but not raw text data sent to a different recipient.

In some embodiments, the request indicates that the first application send communications characteristics to the preauthorization module. The preauthorization module may request, in some embodiments, that the first application send particular communications characteristics. For example, the preauthorization module may request that a first instant messaging application send the conversation participants, the user's average word length, and the user's average sentence length, but not other characteristics. The preauthorization module may request specific communications characteristics on the basis that the requested characteristics are material for the entire user population, a subset of the user population, or for this particular user. For example, the preauthorization module may request that the first application send average word length on the basis that, for the vast majority of users, average word length remains relatively constant regardless of other variables. This may advantageously enable the preauthorization module to predict a change in the user based on a significant change in average word length. In other embodiments, the preauthorization module may request communications characteristics generally without requesting specific communications characteristics.

In some embodiments, the request indicates that the first application anonymize communications characteristics before sending them to the preauthorization module. As discussed above, the first application may anonymize communications characteristics by generating an identifier disassociated from the user, then sending the identifier with the anonymous communications characteristics.

At 720 in the illustrated embodiment, the first application determines communications characteristics based on communications content on the first application. For example, the first application may sum the number of words in numerous text messages, then divide by the number of messages to determine the average number of words per message. In some embodiments, the first application may simply record device or application settings to determine communications characteristics (e.g. font selection in an instant messaging application, or volume selection in a videoconferencing application). In some embodiments, first application may determine communications characteristics based on various feature extraction techniques. As used herein, "feature extraction" is used according to its well-understood meaning in the art, which includes independent component analysis, principal component analysis, kernel principal component analysis, multilinear component analysis, partial least squares regression, latent semantic analysis, multifactor dimensionality reduction, and audio and image processing techniques, among other methods. In some embodiments, the first application may extract communications characteristics from communications content based on various machine learning techniques, as discussed above. For example, the first application may learn, based on historical use, what characteristics a user's communications consistently exhibit, then extract those characteristics that are material to the user's identity. The learning may be based on training data with known results (e.g., after it is known whether or not the communications are from the user to be authenticated). In some embodiments, the first application may determine secondary communications characteristics from other communications characteristics. For example, the first application may run a multivariable regression on a characteristic such as word length, then use the coefficient for an explanatory variable as a communication characteristic (e.g. a coefficient of 2.1 describes the linear relationship between the user's average word length, in characters, and average sentence length, in words).

In other embodiments, the first application may simply provide raw communications content for processing by the preauthorization module. This may reduce processing requirements for client devices but may provide less security for user data than the embodiment of FIG. 7.

In some embodiments, the first application may associate particular communications characteristics with a particular user, based on whether those characteristics are determined to be predictive of the user's identity. For example, a first application may choose to send to a preauthorization module the average word length in a user's text message, based on having learned that the average word length is a strong predictor of that particular user. As another example, a first application may choose not to send to a preauthorization module the brightness setting in a user's videoconferencing application, as the setting has little relation to that user's identity. In some embodiments, the preauthorization module may request that the first application send specific communications characteristics on the basis that the requested characteristics are descriptive of a population subset that includes the expected user.

At 730 in the illustrated embodiment, the first application sends the communications characteristics to the preauthorization module. The communications characteristics may be transmitted internal to a user device (e.g. between two software applications), between two devices via a short-range channel (e.g. Bluetooth), between two devices over a network (e.g. a LAN or the Internet), or by other methods. In some embodiments, the first application continuously updates communications characteristics as the user inputs additional information into the first application and transmits communications characteristics in real-time. The first application may buffer communications characteristics data for streaming to the preauthorization module at regular time intervals. In some embodiments, the first application may send only those communications characteristics that have changed since the last transmission.

FIG. 8 is a flow diagram illustrating progressively authorizing levels of authentication based on additional communications, according to some embodiments. In the illustrated embodiment, the elements of FIG. 8 are performed subsequently to at least a portion of the elements of FIGS. 6 and/or 7. The method shown in FIG. 8 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired.

At 810 in the illustrated embodiment, a preauthorization module (e.g. preauthorization module 122, 142, or 332) receives from a first application (e.g. first application 112, 132, or 302) additional information indicative of further communications via the first application. Additional information indicative of further communications may be the content of communications and/or communications characteristics. In some embodiments, the first application may send both communications content (e.g. raw text data) and communications characteristics (e.g. average sentence length). The additional information received by the preauthorization module may be of a different type than information previously sent. For example, the preauthorization module may have previously received communications characteristics for text messages (e.g. message length, average word length, average periods per message) between a user and a first recipient; however, the preauthorization module may additionally receive raw emoticon data from messages between a user and a second recipient. This may advantageously tailor authentication criteria to the user's context, enabling preauthentication based on material criteria that have a strong correlation to the user's identity.

Additional information may be based on further communications that occur via different media, applications, devices, and/or channels. For example, the first application may be a videoconferencing application that includes an instant messaging function. The first application may initially send raw video data to a preauthorization module, then later send further communications via the text messaging function, such as emoticons frequently used. As another example, the first application may be a teleconferencing application that initially sends information based on communications occurring via a mobile device, but later sends information based on communications occurring via a car radio (i.e. after the call transitions from the mobile device to the car radio). In some embodiments, the additional information may be based on further communications that occur via the same media, devices, or channels. For example, a first application may continue to send instant message content to a preauthorization module as the user continues to write additional messages.

At 820 in the illustrated embodiment, the preauthorization module determines, based on the additional received information, whether to preauthenticate the user to at least a second portion of an authentication procedure to perform an action via a second application. In some embodiments, the preauthentication decision is based on the same authentication criteria as used for prior preauthentication decisions. For example, a preauthorization module receiving additional raw text data may continue to make preauthentication decisions based on the average word length in text data. In other embodiments, the preauthentication decision is based on different authentication criteria than the criteria used for prior preauthentication decisions. For example, a preauthorization module receiving emoticon data after receiving raw text data may decide whether to preauthenticate based on the number of emoticons used per message, whereas previous preauthentication decisions were based on the average word length in text data.

A second portion of an authentication procedure may be any number of authentication steps, including all remaining steps, performed as part of the authentication procedure, in some embodiments. For example, a first preauthentication may have approved a user to a first factor, a password, in a two-factor authentication, and a second preauthentication based on additional received information may approve access for the second factor, a keycard swipe, such that the user does not have to perform any authentication for access after the second preauthentication. The preauthenticated portion may be a first, second, or subsequent factor in a multi-factor authentication. When the user attempts to perform an action on the second application, the preauthenticated portion of the authentication procedure associated with that action may be approved without explicit user input to the second application (e.g., without providing authentication credentials for the preauthenticated portion).

At 830 in the illustrated embodiment, the preauthorization module communicates, based on the determination, the preauthentication to an authentication module of a second application. The communicated preauthentication may be sent internal to a user device (e.g. between two software applications), between two devices via a short-range channel (e.g. Bluetooth), between two devices over a network (e.g. a LAN or the Internet), or by other methods. In some embodiments, the communicated preauthentication approves a user for an action that the user has performed previously. For example, the user may have been previously preauthenticated to a second factor (e.g. a CAPTCHA test to identify human users) in a two-factor authentication procedure to log-in to a website, and preauthentication based on additional information allows the user to log-in to a secure website without having to input either factor. In other embodiments, the communicated preauthentication approves the user for an action that the user has not performed previously. For example, a user may have previously provided a first factor (e.g. a fingerprint scan), and preauthentication based on additional information approves the user to a second factor (e.g. a keypad entry), such that the user can enter a previously inaccessible restricted facility.

In some embodiments, the preauthorization module may communicate a preauthentication to an authentication module multiple times. For example, after receiving additional text message information from a first instant messaging application, the preauthorization module may communicate to an authentication module of the second application that it should still allow a user to perform an authenticated action. In some embodiments, the authentication module may revoke the preauthentication if the preauthorization module does not update approval with sufficient frequency. For example, if a user ceases to use a first instant messaging application, after a time lapse of a threshold number of minutes, the authentication module may revoke an existing preauthentication for the user to log-in to a secure website on a second application without credentials.

FIG. 9 is a flow diagram illustrating an exemplary method for revoking authentication based on additional communications, according to some embodiments. In the illustrated embodiment, the elements of FIG. 9 are performed subsequently to at least a portion of the elements of FIGS. 6 and/or 7. The method shown in FIG. 9 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired.

At 910 in the illustrated embodiment, a preauthorization module (e.g. preauthorization module 122, 142, or 332) receives from a first application (e.g. first application 112, 132, or 302) additional information indicative of further communications via the first application. Additional information indicative of further communications may be the content of communications and/or communications characteristics. In some embodiments, the first application may send both communications content (e.g. raw text data) and communications characteristics (e.g. average sentence length). The additional information received by the preauthorization module may be of a different type than information previously sent. For example, the preauthorization module may have previously received communications characteristics for text messages (e.g. message length, average word length, average periods per message) between a user and a first recipient; however, the preauthorization module may additionally receive raw emoticon data from messages between a user and a second recipient.

Additional information may be based on further communications that occur via different media, applications, devices, or channels. In some embodiments, the additional information may be based on further communications that occur via the same media, devices, or channels. For example, a first application may continue to send instant message content to a preauthorization module as the user continues to write additional messages.

At 920 in the illustrated embodiment, the preauthorization module revokes preauthentication to at least a portion of an authentication procedure. In some embodiments, the decision to revoke is based on the same authentication criteria as used for prior preauthentication decisions. For example, a preauthorization module receiving streaming video data may decide to revoke preauthentication based on the same facial recognition criteria used for prior preauthentication decisions (e.g. when the camera captures a user different than the one originally preauthenticated). In some embodiments, the decision to revoke preauthentication is based on authentication criteria different from authentication criteria used previously. For example, a user previously preauthenticated to an action based on his average word length in instant messages may lose that preauthentication when he sends an instant message to a new and unusual recipient, based on comparison to previously irrelevant criteria regarding the message recipient. Revocation supports continuous updating of authentication criteria and serves to protect user information when the user's environment changes materially.

At 930 in the illustrated embodiment, the preauthorization module communicates, based on the determination, the revocation to an authentication module of a second application. The communicated revocation may be sent internal to a user device (e.g. between two software applications), between two devices via a short-range channel (e.g. Bluetooth), between two devices over a network (e.g. a LAN or the Internet), or by other methods. In some embodiments, the revocation may terminate an in-progress user action on the second application. For example, when a preauthorization module decides to revoke access based on received information, the authentication module of a second online application may automatically log out a user browsing secure online content.

The user may be performing an action previously approved based on contextual authentication and/or based on the user's prior input at the time authentication is revoked. For example, the user's may have access to secure online content based on a password provided as a first authentication factor and contextual authentication for a second authentication factor based on the user's instant messaging habits. When the preauthorization module determines to revoke access based on a change in instant messaging habits, the authentication module logs the user out of the previous online session. As another example, a user may have access to a restricted database based on a fingerprint scan provided as a first authentication factor and a keycard provided as a second authentication factor. When the preauthorization module determines to revoke access based on a change in instant messaging habits, the authentication module for a second application may disconnect the user from the database. In some embodiments, the revocation may prompt the user for additional authentication input prior to terminating an in-progress user action on the second application. For example, a user browsing secure online content may be prompted to re-enter a password when information received from a first application no longer supports his ongoing authentication. The user's continued access may be terminated if he enters the password incorrectly but allowed if he enters the password correctly.

FIG. 10 is a flow diagram illustrating contextual authentication with a third application, according to some embodiments. Authentication with a third application may have the advantage of providing a larger dataset containing more diverse sources of information to provide better context for authentication decisions. Authentication with a third application also may provide the benefit of comparing user interactions with multiple applications simultaneously to derive additional communications characteristics (e.g. whether user was typing in both applications at the same time). In the illustrated embodiment, the elements of FIG. 10 are performed subsequently to at least a portion of the elements of FIGS. 6 and/or 7. The method shown in FIG. 10 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired.

At 1010 in the illustrated embodiment, a preauthorization module (e.g. preauthorization module 122, 142, or 332) receives from a third application (e.g. third application 508) additional information indicative of communications via the third application. In some embodiments, the user communicates with the first application and the third application via the same device. In other embodiments, the user communicates with the first and third applications on different devices. For example, the first application may be a video-conferencing application on the user's laptop, and the third application may be an instant messaging application on the user's mobile device. Additional information indicative of communications may be the content of communications and/or communications characteristics. In some embodiments, the first application sends communications content while the third application sends communications characteristics. For example, a first teleconferencing application may send raw audio data, and a third gaming application may send the average time a user has the application open. In some embodiments, both the first and the third application send both communications content and communications characteristics.

At 1020 in the illustrated embodiment, the preauthorization module determines, based on the additional received information, whether to preauthenticate the user to at least a portion of an authentication procedure to perform an action via a second application. In some embodiments, the preauthorization module determines whether to preauthenticate based on a comparison of information received from the first and third applications. For example, the preauthorization module may compare the velocity of user's mobile device during instant messaging with images from a videoconferencing application and determine to deny preauthentication on the grounds that the user appeared to be moving while using one application and stationary while using the other.

The information received from the third application may be compared to the same authentication criteria as that used to evaluate information received from the first application, in some embodiments. For example, text data from an email application may be added to text data from an instant messaging application to provide a larger dataset for comparison to text-based authentication criteria, such as average word length, use of punctuation and capitalization, and common vocabulary. This may have the advantage of improving the reliability of information received from the first application. In some embodiments, the information received from the third application may be compared to different authentication criteria than the information received from the first application. For example, text data received from a first instant messaging application may be compared to vocabulary criteria, while videoconferencing images from a third application may be compared to facial recognition criteria. This may have the advantage of providing redundancy, making it more difficult for a malicious individual to manipulate a single type of input to a single application.

At 1030 in the illustrated embodiment, the preauthorization module communicates, based on the determination, the preauthentication for at least a portion of an authentication procedure to an authentication module of a second application. The preauthentication may be sent internal to a user device (e.g. between two software applications), between two devices via a short-range channel (e.g. Bluetooth), between two devices over a network (e.g. a LAN or the Internet), or by other methods. In some embodiments, the preauthorization module revokes preauthentication based on information received from the third application. For example, a preauthorization module may preauthenticate a user to access transaction files based on instant message text indicating one user, but revoke the preauthentication based on facial recognition data from a videoconferencing application on the same device, indicating that the user is a different person.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Embodiments of this disclosure may be implemented in numerous ways, including as a method, a process, an apparatus, a system, a computer readable medium such as a computer readable storage medium or a computer network wherein program instructions are sent over optical or communication links. A component such as a processor or a memory described as being configured to perform a task includes both general components that are temporarily configured to perform the task at a given time and/or specific components that are manufactured to perform the task. In general, the order of the steps of disclosed methods or processes may be altered.

What is claimed is:

1. A system, comprising:
one or more processors;
one or more memories having program instructions stored thereon that are executable by the one or more processors to perform operations comprising:
receiving, from a preauthorization module, a request for information indicative of communications between a first user of the system and a second user via a first application, wherein the first application is a real-time communication platform;
determining, based on the request, communications characteristics based on text data included in content of the communications; and
sending the communications characteristics to the preauthorization module, wherein the preauthorization module uses the communications characteristics to preauthenticate the first user, to at least a portion of an authentication procedure to perform an operation via a second application, wherein the pre-authentication is performed prior to receiving a request to perform the operation via the second application;
wherein the determining and sending are performed multiple times to include additional characteristics of communications via the first application.

2. The system of claim 1, wherein the preauthorization module, based on the additional information, is configured to preauthenticate the first user to at least a second portion of the authentication procedure to perform the operation via the second application.

3. The system of claim 1, wherein the operations further comprise:
determining additional communications characteristics based on additional content of communications via the first application; and
sending the additional communications characteristics to the preauthorization module, wherein the preauthorization module is configured to revoke the preauthentication based on the additional communications characteristics.

4. The system of claim 1, wherein the communications characteristics relate to at least one of: images, vocabulary, syntax, diction, punctuation, font, use of emoticons, volume, or tone of communications content, time, medium, frequency, participants, duration, or location of communications, application settings, devices, or channels used to communicate, or fingerprint information, facial recognition information, voice recognition information, or retinal scan information contained in communications content.

5. The system of claim 1, wherein the operations further comprise:
sending additional communications characteristics based on content of communications between the first user and another user via a third application to the preauthorization module, wherein the preauthorization module is configured to use the communications characteristics based on communications content on the first application and the additional communications characteristics to preauthenticate the first user to at least a portion of an authentication procedure to perform an operation via the second application.

6. A method, comprising:
receiving, at a preauthorization module of a computer server, information indicative of communications between a first user and a second user via a first application, wherein the information is based on text data included in content of the communications and wherein the first application is a real-time communication platform;
determining, by the preauthorization module based on the received information, to preauthenticate the first user to at least a portion of an authentication procedure to perform an operation via a second application, wherein the determining to preauthenticate is performed prior to a request by the first user to perform the operation via the second application; and
communicating, by the preauthorization module to an authentication module of the second application, that the at least a portion of the authentication procedure is approved for the request to perform the operation via the second application;
wherein the receiving and determining are performed multiple times to include additional characteristics of communications via the first application.

7. The method of claim 6, wherein the information indicative of communications includes content of communications.

8. The method of claim 6, wherein the information indicative of communications includes communications characteristics.

9. The method of claim 8, wherein the communications characteristics relate to at least one of: images, vocabulary, syntax, diction, punctuation, font, use of emoticons, volume, or tone of communications content, time, medium, frequency, participants, duration, or location of communications, application settings, devices, or channels used to communicate, or fingerprint information, facial recognition information, voice recognition information, or retinal scan information contained in communications content.

10. The method of claim 6, wherein the operation includes at least one of:
accessing private information, accessing a physical location, accessing a secure communications channel, or performing a transaction.

11. The method of claim 6, further comprising:
receiving, at the preauthorization module, additional information indicative of further communications between the first user and the first application;
determining, by the preauthorization module based on the additional received information, to preauthenticate the first user to at least a second portion of the authentication procedure to perform the operation via the second application; and
communicating, by the preauthorization module to an authentication module of the second application, that the at least a second portion of the authentication procedure is approved for a subsequent request to perform the operation via the second application.

12. The method of claim 6, further comprising:
receiving, at the preauthorization module, additional information indicative of further communications between the first user and the first application;
revoking, by the preauthorization module based on the additional received information, preauthentication to the at least a portion of the authentication procedure to perform the operation via the second application; and
communicating, by the preauthorization module to an authentication module of the second application, that the at least a portion of the authentication procedure is not approved for a subsequent request to perform the operation via the second application.

13. The method of claim 6, further comprising:
in response to information indicating that the preauthentication of the at least a portion of the authentication procedure should not have been performed, adjusting one or more parameters to be used in determining to preauthenticate one or more subsequent authentication procedures.

14. The method of claim 6, further comprising:
subsequently authorizing the operation based on the preauthentication without re-performing one or more authentication steps corresponding to the preauthentication.

15. A non-transitory computer-readable medium having computer instructions stored thereon that are capable of causing a computing device to perform operations comprising:
receiving information indicative of communications between a first user and a second user via a first application, wherein the information is based on text data included in content of the communications and wherein the first application is a real-time communication platform;
determining, based on the received information, to preauthenticate the first user to at least a portion of an authentication procedure to perform an operation via a second application, wherein the determining to preauthenticate is performed prior to a request by the first user to perform the operation via the second application; and
communicating, to an authentication module of the second application, that the at least a portion of the authentication procedure is approved for the request to perform the operation via the second application;
wherein the receiving and determining are performed multiple times to include additional characteristics of communications via the first application.

16. The non-transitory computer-readable medium of claim 15, wherein the information indicative of communications includes content of communications.

17. The non-transitory computer-readable medium of claim 15, wherein the information indicative of communications includes communications characteristics.

18. The non-transitory computer-readable medium of claim 15, wherein the operations further comprise:
receiving additional information indicative of further communications between the first user and the first application;
determining, based on the additional received information, to preauthenticate the first user to at least a second portion of the authentication procedure to perform the operation via the second application; and
communicating, to an authentication module of the second application, that the at least a second portion of the authentication procedure is approved for a subsequent request to perform the operation via the second application.

19. The non-transitory computer-readable medium of claim 15, wherein the operations further comprise:
receiving additional information indicative of further communications between the first user and the first application;
revoking, based on the additional received information, preauthentication to the at least a portion of the authentication procedure to perform the operation via the second application; and
communicating, to an authentication module of the second application, that the at least a portion of the authentication procedure is not approved for a subsequent request to perform the operation via the second application.

\* \* \* \* \*